(12) United States Patent
Aceituno Castro et al.

(10) Patent No.: US 11,982,804 B2
(45) Date of Patent: May 14, 2024

(54) LARGE SCALABLE APERTURE-COMBINED OPTICAL TELESCOPE

(71) Applicants: CONSEJO SUPERIOR DE INVESTIGACIONES CIENTÍFICAS, Madrid (ES); FUNDACIÓN ASTROHITA, Toledo (ES)

(72) Inventors: Jesús Aceituno Castro, Granada (ES); José Luis Ortiz Moreno, Granada (ES); Faustino Organero Villajos, Granada (ES); John Davenport, Potsdam/Alemania (DE); Kalaga Madhav, Potsdam/Alemania (DE); Martin Matthias Thomas Roth, Granada (ES)

(73) Assignees: CONSEJO SUPERIOR DE INVESTIGACIONES CIENTÍFICAS, Madrid (ES); FUNDACIÓN ASTROHITA, Toledo (ES)

( * ) Notice: Subject to any disclaimer, the term of this patent is extended or adjusted under 35 U.S.C. 154(b) by 197 days.

(21) Appl. No.: 17/770,893

(22) PCT Filed: Oct. 29, 2020

(86) PCT No.: PCT/ES2020/070665
§ 371 (c)(1),
(2) Date: Apr. 21, 2022

(87) PCT Pub. No.: WO2021/084152
PCT Pub. Date: May 6, 2021

(65) Prior Publication Data
US 2022/0397754 A1 Dec. 15, 2022

(30) Foreign Application Priority Data

Oct. 29, 2019 (ES) .................................. 201930947

(51) Int. Cl.
G02B 23/04 (2006.01)
G02B 23/06 (2006.01)
G02B 23/10 (2006.01)

(52) U.S. Cl.
CPC ............. *G02B 23/04* (2013.01); *G02B 23/06* (2013.01); *G02B 23/10* (2013.01)

(58) Field of Classification Search
CPC ......... G02B 23/04; G02B 23/06; G02B 23/10
(Continued)

(56) References Cited

U.S. PATENT DOCUMENTS

| 5,108,168 A | 4/1992 | Norbert. Massie A et al. |
| 6,185,037 B1 | 2/2001 | Lutz et al. |
| 6,225,619 B1 | 5/2001 | Rhoads |

FOREIGN PATENT DOCUMENTS

| CN | 107843954 A | 3/2018 |
| CN | 110018544 A | 7/2019 |
| WO | 2015120074 A1 | 8/2015 |

*Primary Examiner* — William Choi
(74) *Attorney, Agent, or Firm* — Hayes Soloway PC

(57) ABSTRACT

It comprises optical assemblies that focus light onto individual first optical fibers which are combined together in a final single optical fiber, collecting a considerable amount of light from a target, to feed an instrument such as a spectrograph. The first optical fibers are kept centred on the target through image devices that also provide images, and these images can be combined to give rise to a high-quality image of the field surrounding the target. The final effective aperture of the device is scalable, using different numbers of optical assemblies and depending on their diameters.

10 Claims, 4 Drawing Sheets

(58) Field of Classification Search
USPC .......................................................... 359/629
See application file for complete search history.

LARGE SCALABLE APERTURE-COMBINED OPTICAL TELESCOPE

CROSS-REFERENCE TO RELATED APPLICATIONS AND PRIORITY

This patent application claims priority from PCT Application No. PCT/ES2020/070665 filed Oct. 29, 2020, which claims priority from Spanish Patent Application No. P201930947 filed Oct. 29, 2019. Each of these patent applications are herein incorporated by reference in its/their entirety.

OBJECT OF THE INVENTION

The object of the invention is a scalable aperture-combined optical telescope, which comprises at least several optical assemblies that focus the light from a target on individual optical fibers. This allows combining the central part of the incoming rays through a photonic lantern that can feed a spectrograph (or a polarimeter or a photometer). The rest of the light is simultaneously collected in CMOS or CCD devices that act as guiders to keep the central target within the optical fibers' cross section, and the recorded images can be combined with appropriate algorithms resulting in improved images.

BACKGROUND OF THE INVENTION

Nowadays, large aperture telescopes are needed for many scientific applications in Astronomy and Astrophysics, but also for technological applications (such as connection links between satellites for telecommunications with ground-based stations or space debris detection and tracking, or satellite tracking). Large apertures are needed in order to collect as many photons as possible from the faint light sources to be studied or detected.

In the last decades, large facilities have been developed around the world allowing us to increase the light collecting area and therefore unveiling a new astrophysical framework. Examples of these facilities are the GranTeCan, the Keck Telescope, the Very Large Telescope (VLT), the Subaru telescope, and others, which are all 10-meter class telescopes. Other facilities of larger aperture currently under construction or development are the European Southern Observatory's (ESO) Extremely Large Telescope (ELT), the Giant Magellan Telescope (GMT), the Large Binocular Telescope (LBT), etc.

The large aperture of these telescopes is achieved with either:
a) single monolithic mirrors
b) segmented mirrors Single monolithic mirrors of very large aperture are extremely expensive to build, extremely heavy and extremely complex to handle. Segmented mirrors are made from different pieces of typically two meters in size, each one with different optical parameters, which together form a single mirror. However, they are also difficult to build, expensive, heavy, and difficult to align and handle, especially due to the need of actuators of the active optics system and software to control them.

The common factor between all of them is the manufacturing and handling complexity, which leads to a very high budget (over hundreds of millions of euros in the best case) and high operation costs. Additionally, such telescopes should ideally be designed with a faster focal ratio (less than f/2) and a large effective field of view (FoV), but this is not feasible due to the impossibility to build optical elements with large apertures and short focal distances.

In addition, in order to cover fields of view of just a dozen arcminutes, imaging instrumentation for these telescopes is extremely complex and expensive. For larger fields of view, the cost and complexity are even higher.

With the goal of decreasing the cost and complexity of large telescopes, by decreasing the weight and the optical complexity of the large mirrors, as well as reducing the sizes of the buildings and structures and auxiliary equipment, a new approach has been devised.

DESCRIPTION OF THE INVENTION

The object of the invention consists on a scalable aperture-combined optical telescope, with several optical assemblies, preferably more than three. Each of the optical assemblies comprise an optical tube, with an aperture aimed to a target for receiving light, and a light output, for exiting the light. The optical tube works as any common telescope optical tube, receiving the light and reflecting it inside, until it exists the optical tube by the light output. The optical tube is also defined by an output axis.

In a first embodiment of the invention, each optical assembly comprises an active optical package, aligned with the output axis of the optical tube. Such active optical package is comprised of the following elements, placed in the following sequence:
   an atmospheric dispersion corrector (ADC)
   a focuser device (FD)
   a tip-tilt refractive compensator (TT)
   an image device The image device is intended to receive the light from the tip-tilt refractive compensator. Said image device can comprise a filter wheel, intended to filter the light, and a camera following the filter wheel. The camera could be, for example a cooled CCD (Charge Coupled Device) or CMOS (Complementary Metal-Oxide Semiconductor) low readout-noise camera.

In a second embodiment of the invention, the active optical package can also comprise, next to the tip-tilt refractive compensator an alignment frame is positioned. The alignment frame is intended to hold a first optical fiber. The first optical fiber is intended to receive the light already collected by the optical tube that has passed through the active optical package (ADC, FD, TT).

In this second embodiment, each active optical package also comprises a flat diagonal flip mirror, positioned between the tip-tilt refractive compensator and the alignment frame. The flat diagonal flip mirror comprises a drilled hole, which is intended to be aligned with the output axis of the optical tube. The first optical fiber in inserted in said drilled hole. In this embodiment, the flat diagonal flip mirror reflects the light onto the image device, and therefore into the camera.

The cameras have a double purpose. The purposes in the first embodiment is to record the field of view of each optical assembly. The gathered images are summed together to achieve a much better image in terms of sensitivity. The second purpose, which can be applied in the second embodiment of the invention, is to keep the first optical fiber well aligned to the output axis of the optical tubes in order to receive the light, by adjusting the Tip-Tilt refractive compensators.

The idea of the scalable aperture-combined optical telescope of the present invention consists of combining multiple optical assemblies as described, resulting in a new facility with a large effective aperture, combining all the apertures of every optical assemblies involved.

Once the light is gathered by each first optical fiber, a photonic lantern is used to combine all the light received from each optical assembly.

A photonic lantern is a type of fiber optic coupler which combines the light from many single first optical fibers into one, the single optical fiber, typically produced by stacking a bundle of fibers before drawing and fusing them into a single optical fiber. Light from each of the optical assemblies will be combined into one single optical fiber through a photonic lantern.

Traditionally, photonic lanterns are produced by stacking a bundle of SMFs (single mode optical fiber) inside a capillary, and tapering them down to fuse into a single MMF (multimode optical fiber). The capillary becomes the cladding of the single MMF, the claddings of the SMFs become the core of the MMF and, importantly, the cores of the SMFs are reduced to the point that they can no longer efficiently couple light.

However, the individual optical assemblies used for the scalable aperture-combined optical telescope have preferably a PSFs (point spread function) of approximately 23 µm, which cannot be efficiently coupled into a SMF. MMFs cannot be drawn into photonic lanterns in the traditional way as their significantly larger cores are still able to couple light even after tapering. Consequently, light does not propagate across the single optical fiber and may lead to erroneous spectroscopic measurements.

To overcome said problem the photonic lanterns of the present invention couple light from many MMFs to a single MMF by stacking and tapering single optical fibers with high core-to-cladding ratios such that claddings, when tapered, become too thin to efficiently confine light. Unlike with traditional designs, the core of the single optical fiber section is formed by fusing the cores of the first optical fibers, with the cladding formed from the capillary.

The single optical fiber feeds the light into a measuring device, allowing the light from all the optical assemblies to be summed together into a single device. The measuring device could be a spectrograph, a polarimeter or a photometer.

The optical tubes may have diameters of anything over 20 cm, but preferably 40 cm, where the relationship collecting area vs cost is currently optimal. Such optical tubes could be commercial off the shelf (COTS) or custom-designed, therefore cheap and easy to be manufactured. Besides, for this size range the performance of tip-tilt actuators is optimized to compensate for atmospheric turbulence. Because the main component of the atmospheric induced aberration in this size range is tip-tilt.

The individual optical assemblies may be attached to a common mounting. Each mounting with several optical assemblies attached is referred to as a module. It can be also possible that each optical assembly is attached individually to a mounting. Light from multiple modules can be collected in the same manner, combining the light received from each module via a photonic lantern into a final single optical fiber.

By combining the light from many modules using a photonic lantern, the combination is done photonically, rather than electronically, therefore the maximum light can be coupled into the measuring device and the effect of the noise can be minimized.

The main operational mode of the scalable aperture-combined optical telescope, object of the present invention, is for spectroscopic measurements and image acquisition. Both objectives can be achieved in the second embodiment of the invention. If only the first embodiment is implemented, the telescope can be just used for image acquisition.

Traditionally, astronomical spectroscopic measurements are made by collecting light from a telescope, which comprises a final single optical tube, into an optical fiber which feeds a measuring device.

The larger the telescope diameter (aperture), the higher the amount of light that can be collected and therefore, the more sensitive the measurements that can be made. The present invention instead collects light from many smaller optical tubes, and couples them together with a photonic lantern, before feeding it into the measuring device.

During the main operational mode, the light that exits the tip-tilt refractive compensator, which constitutes a sky image, is reflected on the flat diagonal flip mirror and onto the image device. As explained before, the flat diagonal flip mirror comprises a drilled hole, intended to be aligned with the output axis of the optical tube.

When the optical tube is aimed to a target, the flat diagonal flip mirror reflects a sky image that shows the target but also the drilled hole, and consequently the first optical fiber, which is inserted in the drilled hole. By moving the optical tube or the tip-tilt refractive compensator, the target can be centred into the first optical fiber position. This might also be used to guide the mount, to compensate tracking errors on each optical assembly, as well as to acquire sky images in the camera, which can be then processed afterwards by using a special optimal combination algorithm.

The algorithm can account for the slightly different optical scales and distortions of the optical assemblies, as well as slight decentring and rotations of the active optical package.

The main aim of the algorithm is to minimize the cosmetic defects of the camera, removing cosmic rays, hot pixels, electric nose spikes, diffraction effects caused by the telescope spiders, improving the signal to noise ratio.

The expected result is a significant gain of Signal-to-Noise Ratios (SNR) with increased dynamic range compared to an image from a single aperture telescope, and with a larger field of view than equivalent aperture conventional telescopes. The combination of multiple frames technique has been used in modern Astronomy for decades, typically from a single telescope over a period of time.

One of the main advantages of the present invention is that all the sky images are gathered simultaneously and from many optical assemblies. Besides, if the optical assemblies are equipped with low cost active optics tip-tilt refractive compensator, the expected performance under typical atmospheric turbulent conditions can be improved compared to a conventional telescope.

The combination algorithm allows obtaining SNR values of the combined images equivalent to one obtained by a classical telescope with the equivalent effective diameter, also known as aperture, but with a much larger field of view (FoV), and being the images provided not dominated by the readout-noise. The equivalent aperture is determined by square root of the number of optical assemblies multiplied by the aperture of each optical assembly.

Nowadays, there are some special CCD and CMOS cameras with electron-multiplying technology (EMCCD) or with other technologies able to reach a readout noise as low as 1 electron per pixel, which implies that a background-noise dominated regime is achieved in most of the applications even if very short exposure times or narrow bands are used.

Additionally, the extremely low cost of the CCD and CMOS cameras with high sensibility and extremely low noise makes it cost-effective to use multiple systems rather than a large single mirror with a camera.

The efficiency of the current world-class telescopes is determined by a so-called etendue parameter, defined as the ratio between the aperture and the solid angle covered by the optical assembly over the sky. Large facilities normally provide large collecting areas but small FoV. The concept of scalable aperture-combined optical telescopes presented in this document produces large values of etendue, because it increases the effective aperture whilst keeping the FoV of each optical tube.

Each separated optical assembly is selected to have apertures such that the diffraction limit of each individual optical assembly is slightly lower than the average seeing in a professional observatory (around 1 arc-second). That means that the resolution power of the scalable aperture-combined optical telescope would be limited by the effect of the atmosphere instead of the diffraction limit of each individual optical assembly for the overall system.

The resolving power of the large facilities currently in place is also limited by the atmospheric turbulence except for those equipped with adaptive optics systems, with their main advantage for astronomical applications being their huge collecting capabilities.

As a result, a set of optical assemblies working simultaneously could achieve similar collecting areas, similar resolution power, a significant larger FoV and consequently, a larger etendue.

To sum up, this technique would allow the development of very large effective-aperture telescopes with a much-reduced budget for a range of applications, since the invention proposed here has the following advantages over other telescope realizations:
  the cost and the weight of the mirrors is much smaller than that or those of an equivalent aperture telescope of conventional type,
  the mechanical structures needed and the mounts are also much lighter and they are smaller in volume, which implies that the telescope enclosures can also be much smaller and much cheaper,
  the maintenance and operation costs are lower than in a conventional design, and
  the design allows achieving higher dynamic range imaging than previous realizations.

DESCRIPTION OF THE DRAWINGS

To complement the description being made and in order to aid towards a better understanding of the characteristics of the invention, in accordance with a preferred example of a practical embodiment thereof, a set of drawings is attached as an integral part of said description wherein, with illustrative and non-limiting character, the following has been represented.

PREFERRED EMBODIMENT OF THE INVENTION

With the help of FIGS. 1 to 5, a preferred embodiment of the present invention is described below.

The object of the invention consists on a scalable aperture-combined telescope, which comprises several optical assemblies, preferably more than three. Each of the optical assemblies comprises an optical tube (1), with an aperture (2) aimed to a target in the sky for receiving light, and a light output (3), for exiting the light. The optical tube (1) works as any common telescope optical tube (1), receiving the light and reflexing it inside, until it exists the optical tube (1) by the light output (3). The optical tube (1) is also defined by an output axis (16).

Figure 1A:
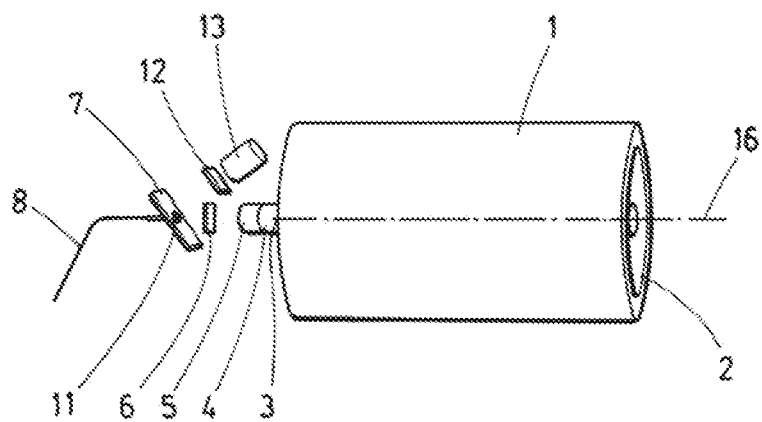
FIG. 1.—Shows an optical assembly in a second embodiment of the invention.
Figure 1B:
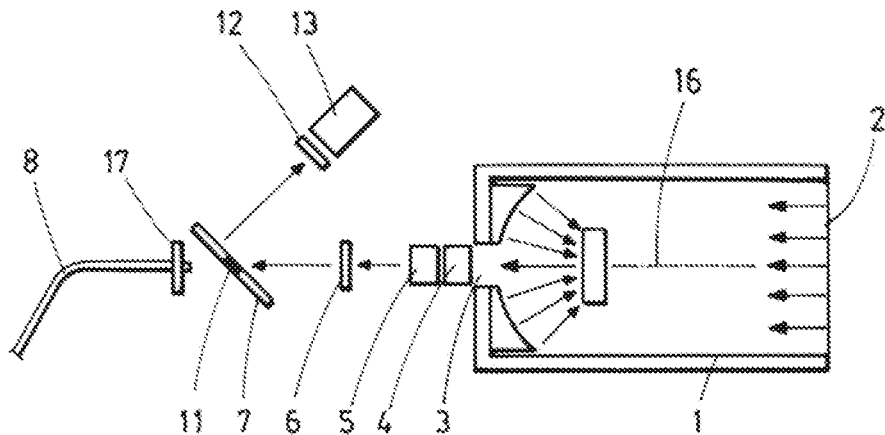

The optical assemblies, shown in FIGS. 1a and 1b, have each an active optical package, aligned with the output axis (16). Such active optical package is comprised of the next elements, placed in the following sequence:
  an atmospheric dispersion corrector (4),
  a focuser device (5),
  a tip-tilt refractive compensator (6),
  a flat diagonal flip mirror (7), which comprises a drilled hole (11) intended to be aligned with the output axis (16) of the optical tube (1),
  an alignment frame (17), which holds a first optical fiber (8) inserted in the drilled hole (11), and which is intended to receive the light, and
  an image device, intended to receive the light when it is reflected on the flat diagonal flip mirror (7).

The image device comprises a filter wheel (12), intended to filter the light reflected on the flat diagonal flip mirror (7), and a camera (13) following the filter wheel. The camera (13) could be, for example a cooled CCD (Charge Coupled Device) or CMOS (Complementary Metal-Oxide Semiconductor) low readout-noise camera (13).

Figure 2:
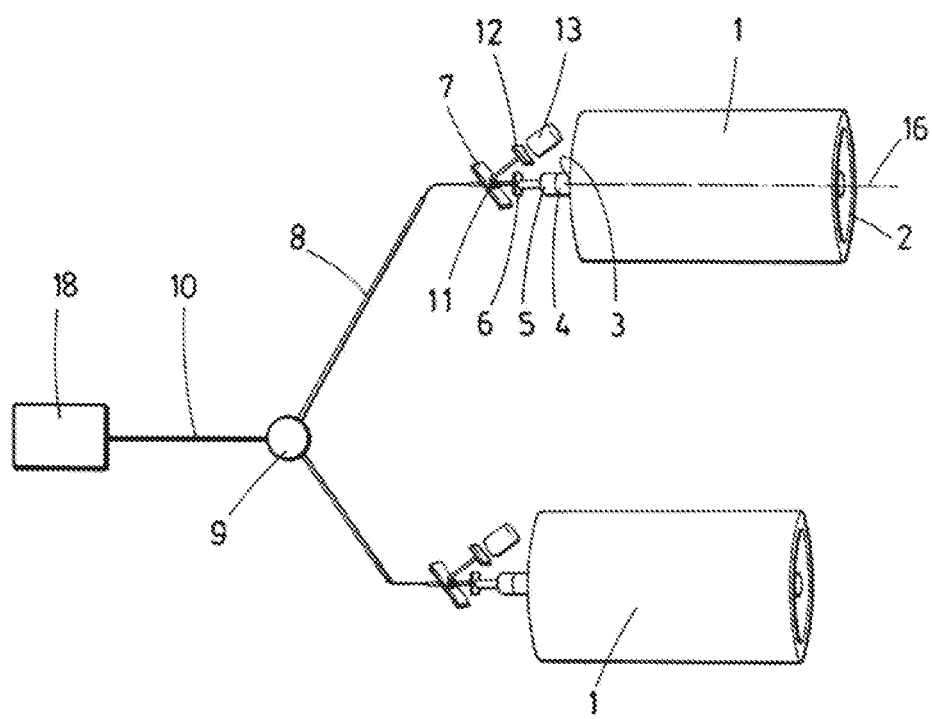
FIG. 2.—Shows two optical assemblies and a photonic lantern which combines the light from the first optical fibers coming from the optical assembly.

The scalable aperture-combined optical telescope of the present invention combines multiple optical assemblies, preferably more than three, as seen in FIG. 2 (where only two assemblies are shown for drawing simplicity), resulting in a telescope with a larger effective aperture equivalent to the square root of the number of assemblies multiplied by the aperture of a single assembly. The light of the target is collected in the individual active optical package associated to each optical tube (1), by the first optical fiber (8).

The cameras (13) record the field of view of each optical assembly and acquire images. The gathered images are summed together to achieve a much better image in terms of sensitivity. The images are processed in an external device by using a special optimal combination algorithm. The main aim of the algorithm is to minimize the cosmetic defects of the camera (13), removing cosmic rays, hot pixels, electric nose spikes and/or diffraction effects caused by the telescope spiders, improving the signal to noise ratio.

The cameras (13) also keep the first optical fibers (8) well aligned to the output axis (16) of the optical tubes (1) by using the Tip-Tilt refractive compensators (6), working as guider devices.

Figure 5A:
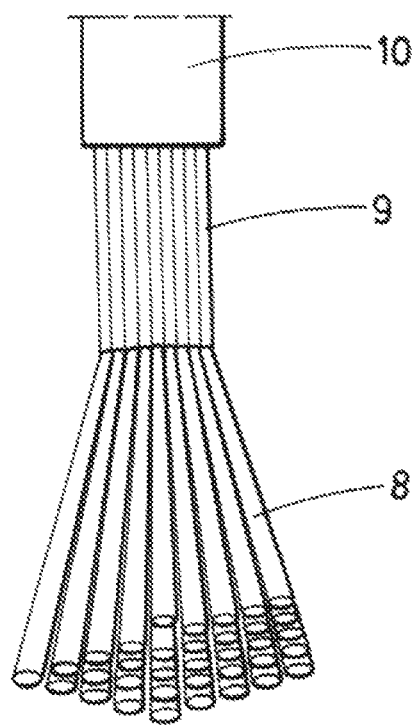
FIG. 5A.—Shows the first optical fibers being combined into a final single optical fiber in the photonic lantern.
Figure 5B:
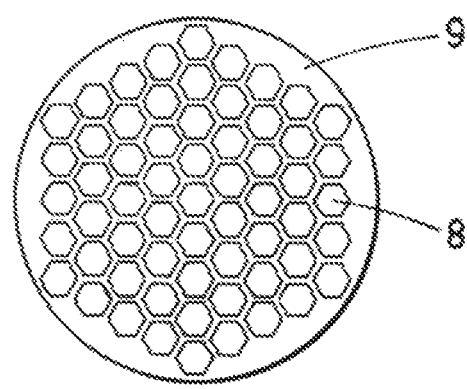
FIG. 5B.—Shows a horizontal section of the photonic lantern.

Once the light is gathered by each first optical fibers (18), a photonic lantern (9) is used to combine all the light received from each optical assembly. Light from each of the optical assemblies will be combined into one final single optical fiber (10) through a photonic lantern (9), as seen in FIGS. 5A and 5B. The final single optical fiber (10) feeds the light into a spectrograph (18), allowing the light from all the optical assemblies to be summed together into a common spectrograph (18).

The photonic lanterns (9) of the present invention couple light from many MMFs (multimode optical fibers) to a single MMF by stacking and tapering single first optical fibers (8), with a core and a cladding, and with high core-to-cladding ratios such that claddings, when tapered, become too thin to efficiently confine light. The core of the final single optical fiber (10) is formed by fusing the cores of the first optical fibers (8), with the cladding formed from the single optical fibers (8).

Figure 3:
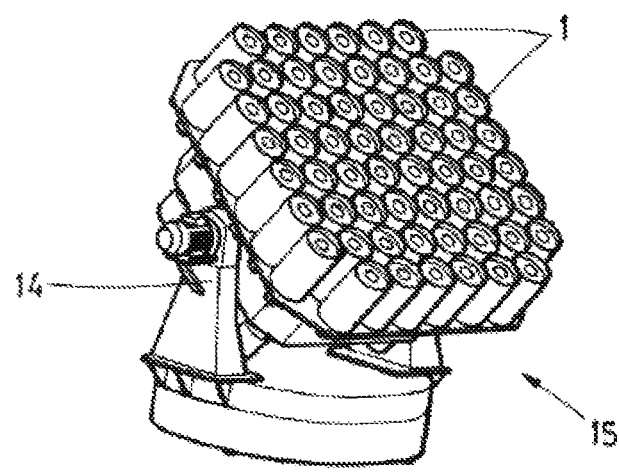
FIG. 3.—Shows a module of optical assemblies mounted on a mount.
Figure 4:
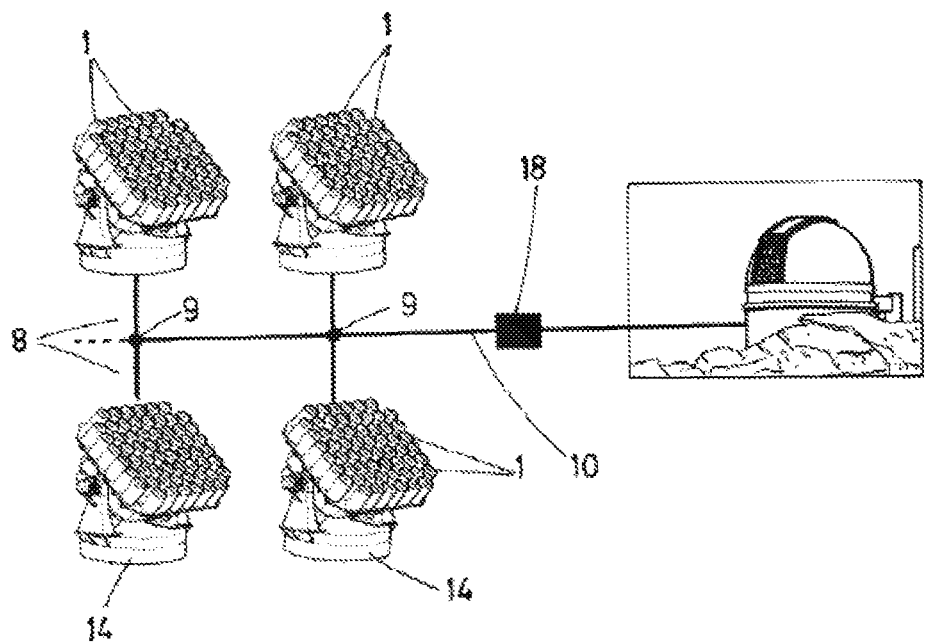
FIG. 4.—Shows a group of modules connected and feeding the same measuring device which can be shared with other existing facilities (in the picture, the 3.5 m telescope of Calar Alto observatory, for instance).

The individual optical assemblies are attached to a common mount (14), as seen in FIG. 3. Each mount (14) with several optical assemblies attached is referred to as a module (15). Light from multiple modules (15) is collected in the same manner, combining the light received from each module (15) via a photonic lantern (9) and fed into a final single optical fiber (10) and a spectrograph (18), as seen in FIG. 4.

By repeating this scheme, larger effective apertures (2) or larger collecting areas can be achieved. As an example, nine modules (15) could correspond to a 15 m class telescope, depending on the exact aperture of the individual assemblies. Additionally, the concept results in a scalable and modular telescope, and could grow with time, depending of the total number of optical assemblies incorporated.

The current invention also comprises a method to operate the scalable aperture-combined optical telescope, for spectroscopic measurements and image acquisition. The steps of said method comprise receiving light in the optical tube (1), correcting the light on the atmospheric dispersion corrector (4), reflecting the light on the flat diagonal flip mirror (7) onto the image device and acquiring images with the cameras (13), adjusting the optical tube (1) and/or the tip-tilt refractive compensator (6)in order to centre the light onto the drilled hole (11) and therefore the first optical fiber (8), combining the light from several fibers (8) into a final single optical fiber (10) via the photonic lantern, feeding the light into the spectrograph (18), and combining the images in an external device acquired in the image device in a final image using appropriate algorithms.

The invention claimed is:

1. A scalable aperture-combined optical telescope, comprising several optical assemblies, each comprising:
    an optical tube aimed to a target, with an aperture for receiving light, a light output and an output axis,
    an active optical package, associated to the light output, comprising:
        an atmospheric dispersion corrector associated to the light output,
        a focuser following the atmospheric dispersion corrector,
        a tip-tilt refractive compensator following the focuser,
        an image device, intended to receive the light from the tip-tilt refractive compensator and acquire images;
        a flat diagonal flip mirror following the tip-tilt refractive compensator, intended to reflect the light onto the image device, and which comprises a drilled hole with capacity of being aligned with the output axis of the optical tube,
        an alignment frame, following the flat diagonal flip mirror,
        a first optical fiber, fixed to the alignment frame, and inserted in the drilled hole of the flat diagonal flip mirror, intended to capture the incoming light from the target,
    wherein each first optical fiber is of multimode optical fiber (MMF) type, and the scalable aperture-combined optical telescope additionally comprising:
        a photonic lantern configured to combine several first optical fibers in a final single optical fiber of multimode optical fiber (MMF) type, by stacking and tapering the first optical fibers with high core-to-cladding ratios such that the claddings, when tapered, become too thin to efficiently confine light, and
        the final single optical fiber, that connects the photonic lantern to a measuring device.

2. The scalable aperture-combined optical telescope of claim 1, wherein the image device comprises a camera.

3. The scalable aperture-combined optical telescope of claim 2, wherein the image device additionally comprises a filter wheel positioned before the camera.

4. The scalable aperture-combined optical telescope of claim 2, wherein the camera is a CCD or CMOS low readout-noise camera.

5. The scalable aperture-combined optical telescope of claim 1, wherein the optical assemblies are installed on a mount or several mounts that can aim to any specific location.

6. The scalable aperture-combined optical telescope of claim 1, wherein the measuring device is a spectrograph.

7. The scalable aperture-combined optical telescope of claim 1, wherein the measuring device is a polarimeter.

8. The scalable aperture-combined optical telescope of claim 1, wherein the measuring device is a photometer.

9. A method for obtaining images from a target, which uses the device of claim 1, and comprising the steps of:
    receiving a light into the optical tubes,
    correcting the light on the atmospheric dispersion corrector,
    reflecting the light on the flat diagonal flip mirror onto the image device, and acquiring images,
    adjusting the optical tube and/or the tip-tilt refractive compensator in order to center the light onto the drilled hole,
    focusing the light from the tip-tilt refractive compensator on the first optical fiber,
    combining the light from several first optical fibers of multimode optical fiber (MMF) type into a final single optical fiber via the photonic lantern configured to combine the first optical fibers in a final single optical fiber of multimode optical fiber (MMF) type, by stacking and tapering the first optical fibers with high core-to-cladding ratios such that the claddings, when tapered, become too thin to efficiently confine light, and
    feeding the light into the measuring device.

10. The method for obtaining images from a target according to claim 9, additionally comprising the step of:
    combining the images from the image devices in a final image, in an external device, using appropriate algorithms.

* * * * *